United States Patent
Van Der Burg et al.

(10) Patent No.: US 10,307,018 B2
(45) Date of Patent: Jun. 4, 2019

(54) APPARATUS FOR PREPARING FOOD

(75) Inventors: Johan Michiel Van Der Burg, Tjerkgaast (NL); Remco Linnewiel, Assen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 979 days.

(21) Appl. No.: 13/818,002

(22) PCT Filed: Sep. 5, 2011

(86) PCT No.: PCT/IB2011/053862
§ 371 (c)(1),
(2), (4) Date: Feb. 20, 2013

(87) PCT Pub. No.: WO2012/032449
PCT Pub. Date: Mar. 15, 2012

(65) Prior Publication Data
US 2013/0180413 A1    Jul. 18, 2013

(30) Foreign Application Priority Data
Sep. 10, 2010  (EP) ..................... 10176189

(51) Int. Cl.
*A47J 37/06* (2006.01)
*F24C 15/32* (2006.01)

(52) U.S. Cl.
CPC ........... *A47J 37/06* (2013.01); *A47J 37/0641* (2013.01); *F24C 15/322* (2013.01)

(58) Field of Classification Search
CPC ...... A47J 37/06; A47J 37/0641; F24C 15/322

USPC .... 219/443, 445, 447; 126/27, 38, 39 R, 40, 126/273 R, 275 R, 273.5, 344, 345, 373,
(Continued)

(56) References Cited

U.S. PATENT DOCUMENTS 3,301,169 A  *  1/1967  Young George A .... A21B 1/50
                                                    425/443
3,820,525 A  *  6/1974  Name Not Available ...................
                                                    A21B 2/00
                                                    126/21 A
(Continued)

FOREIGN PATENT DOCUMENTS

EP       2034872    *   4/2010
EP       2034872 B1     4/2010
(Continued)

*Primary Examiner* — Ibrahime A Abraham
*Assistant Examiner* — Frederick F Calvetti

(57) ABSTRACT

The present invention relates to an apparatus for preparing food by moving a flow of hot air over items of food to heat the food. An apparatus for preparing food according to the invention includes a food preparation chamber (3) with an outer wall (2), an inner wall (4) defining a food receiving space (5) with an air inlet (9) and an air discharge opening (10). The apparatus also includes a fan (12) for moving a flow of hot air successively through the air inlet (9), the food receiving space (5) and the discharge opening (10) and air guide means (6) for returning the flow of air from the discharge opening (10) towards the air inlet (9) separate from the food receiving space (5). A vent (18) is provided which is formed through the outer wall (2) for exhausting air from the food preparation chamber (3) to outside the apparatus and an air guide member (22) directs a portion of the flow of air towards the vent (18).

14 Claims, 5 Drawing Sheets

(58) Field of Classification Search
USPC .......... 126/376; 99/339, 356, 400, 450, 451, 99/446
See application file for complete search history.

(56) References Cited

U.S. PATENT DOCUMENTS

| | | | | |
|---|---|---|---|---|
| 3,821,454 A * | 6/1974 | Name Not Available | | A22C 9/00 426/455 |
| 3,828,760 A * | 8/1974 | Farber | | A21B 1/02 126/21 A |
| 4,029,463 A * | 6/1977 | Johansson | | A21B 1/26 126/21 A |
| 4,132,216 A * | 1/1979 | Guibert | | F25D 25/00 126/21 A |
| 4,295,419 A * | 10/1981 | Langhammer | | A47J 37/047 219/389 |
| 4,307,286 A * | 12/1981 | Guibert | | A23L 3/365 126/21 A |
| 4,374,318 A * | 2/1983 | Gilliom | | 219/400 |
| 4,374,319 A * | 2/1983 | Guibert | | A23L 3/365 126/21 A |
| 4,375,184 A * | 3/1983 | Gilliom | | 99/422 |
| 4,420,679 A * | 12/1983 | Howe | | 219/400 |
| 4,426,792 A * | 1/1984 | Best | | 34/487 |
| 4,426,923 A * | 1/1984 | Ohata | | A47J 39/003 126/20 |
| 4,441,015 A * | 4/1984 | Eichelberger | | A47J 37/0635 219/401 |
| 4,455,478 A * | 6/1984 | Guibert | | A47J 39/003 126/21 A |
| 4,481,396 A * | 11/1984 | Matsubayashi et al. | | 219/681 |
| 4,484,064 A * | 11/1984 | Murray | | 219/400 |
| 4,546,553 A * | 10/1985 | Best | | 34/266 |
| 4,561,348 A * | 12/1985 | Halters | | F24C 15/322 126/21 A |
| 4,771,162 A * | 9/1988 | Schatz | | A61C 13/14 126/21 A |
| 4,776,319 A * | 10/1988 | Colangelo | | A47J 37/06 126/214 D |
| 4,785,552 A * | 11/1988 | Best | | 34/418 |
| 4,817,509 A * | 4/1989 | Erickson | | A47J 37/015 219/386 |
| 5,000,085 A * | 3/1991 | Archer | | 99/445 |
| 5,080,087 A * | 1/1992 | McFadden et al. | | 126/21 A |
| 5,230,161 A * | 7/1993 | Best | | 34/267 |
| 5,403,607 A * | 4/1995 | Erickson | | A47J 37/015 426/466 |
| 5,451,744 A * | 9/1995 | Koopman | | A47J 37/042 219/400 |
| 5,465,651 A * | 11/1995 | Erickson | | A47J 37/015 126/21 A |
| 5,466,912 A * | 11/1995 | Dornbush | | A47J 36/12 126/21 A |
| 5,484,621 A * | 1/1996 | Erickson | | A47J 37/015 426/466 |
| 5,485,780 A * | 1/1996 | Koether | | F24C 15/006 219/400 |
| 5,513,558 A * | 5/1996 | Erickson et al. | | 99/330 |
| 5,513,623 A * | 5/1996 | Hong | | 126/38 |
| 5,588,353 A * | 12/1996 | Glucksman et al. | | 99/348 |
| 5,594,999 A * | 1/1997 | Best | | 34/270 |
| 5,699,722 A * | 12/1997 | Erickson | | A47J 37/0623 126/21 A |
| RE37,238 E * | 6/2001 | Song; Eugene | | A23N 12/08 34/225 |
| 6,541,746 B2 | 4/2003 | Kim et al. | | |
| 6,747,250 B1 | 6/2004 | Cha | | |
| 6,936,795 B1 * | 8/2005 | Moon et al. | | 219/400 |
| 8,299,404 B2 * | 10/2012 | Van Der Weij | | A47J 37/0623 126/21 A |
| 2004/0011350 A1 * | 1/2004 | Dowst et al. | | 126/344 |
| 2005/0223906 A1 | 10/2005 | Xu | | |
| 2008/0105136 A1 * | 5/2008 | McFadden | | 99/339 |
| 2008/0213447 A1 * | 9/2008 | Payen | | A47J 37/043 426/438 |

FOREIGN PATENT DOCUMENTS

| | | |
|---|---|---|
| JP | 03199822 A | 8/1991 |
| JP | 2002310435 A | 10/2002 |
| JP | 2010121899 A | 6/2010 |
| WO | 1993010698 A1 | 6/1993 |
| WO | 2010034338 A1 | 4/2010 |

* cited by examiner

APPARATUS FOR PREPARING FOOD

FIELD OF THE INVENTION

The present invention relates to an apparatus for preparing food. In particular, the present invention relates to an apparatus for preparing food by moving a flow of hot air over items of food to heat them.

BACKGROUND OF THE INVENTION

An apparatus for preparing food is known from EP 2 034 872 B1. The apparatus is generally used in a domestic setting and provides a means of preparing food for eating by circulating a flow of hot air around the food items to heat and/or cook the food. Such an apparatus generally comprises an enclosed food preparation chamber, into which food items are placed and a flow of hot air is then circulated around the food preparation chamber to heat the food.

During the heating process steam is generally generated from water contained in the food, which causes the pressure in the food preparation chamber to increase. Furthermore, other liquids such as oil are also discharged from the food. Therefore, a problem with existing apparatus is that the air, steam and oil under increased pressure in the food preparation chamber is forcibly expelled through holes and gaps in an outer wall of the food preparation chamber to outside the apparatus.

In a known apparatus, a lower portion of the food preparation chamber is removable from the remainder of the apparatus so that food items may be easily placed in or removed from the food apparatus chamber. To aid placement and removal of the food items, the removable lower part of the food preparation chamber is positioned to be removed from a user facing side of the apparatus. However, gaps are formed between the removable part of the food preparation chamber and the rest of the apparatus which are formed on the user facing side of the apparatus. Therefore, a disadvantage of this arrangement is that air, steam and oil under pressure are exhausted through these gaps towards a user.

In addition to the foregoing, it will be appreciated that closing of the gaps by sealing means or repositioning of the removable part of the chamber away from the user facing side of the apparatus side would make the placement and removal of the removable part of the food preparation chamber cumbersome.

SUMMARY OF THE INVENTION

Therefore, it is an object of the invention to provide an apparatus for preparing food which substantially alleviates or overcomes the problems mentioned above.

According to the present invention, there is provided an apparatus for preparing food, comprising a food preparation chamber with an outer wall, an inner wall defining a food receiving space with an air inlet and an air discharge opening, a fan for moving a flow of hot air successively through the air inlet, the food receiving space and the discharge opening, air guide means for returning the flow of air from the discharge opening towards the air inlet separate from the food receiving space, a vent formed through the outer wall for exhausting air from the food preparation chamber to outside the apparatus, and an air guide member provided to direct a portion of the flow of air towards the vent.

Preferably, the air guide member is disposed adjacent to the fan to direct a portion of the flow of air moved by the fan towards the vent.

Conveniently, the air guide member extends to an edge of the vent.

In a preferred embodiment the vent is formed in the outer wall on a line extending in a radial direction to a rotational axis of the fan.

Advantageously, the fan is provided at the discharge opening.

In one embodiment, the air inlet is formed in a lower part of the inner wall and the discharge opening is formed in an upper part of the inner wall.

In a preferred embodiment, the air inlet is an air-permeable section formed in the inner wall.

The air guide member may be a plate with an air guide surface which directs a portion of the flow of air towards the vent.

The air guide member may comprise a first portion disposed adjacent to the fan and a second portion disposed adjacent to the vent which extends at an angle to the first portion so that air guide surfaces of the first and second portions are angled towards each other.

Preferably, the air guide member is mounted to the outer wall.

Conveniently, the air guide member is disposed in the air guide means for returning the air from the discharge opening towards the air inlet.

Advantageously, a part of the food preparation chamber is removable from a front side of the apparatus so that food items are removable from the food receiving space, and the vent is formed in a rear side of the apparatus opposite the front side.

The air guide member may be configured to direct a portion of the flow of air towards the rear side of the apparatus.

Conveniently, a heat radiating means is positioned in the upper part of the food preparation chamber.

Advantageously, the vent is disposed at an upper part of the food preparation chamber.

Preferably, the apparatus further comprises air guide fins to deflect the flow of air exhausted through the vent.

BRIEF DESCRIPTION OF THE DRAWINGS

Preferred embodiments of the invention will now be described, by way of example only, with reference to the accompanying drawings, in which.

DETAILED DESCRIPTION OF THE EMBODIMENTS

An apparatus for preparing food is shown in the Figures comprising an outer shell 1. The apparatus is configured to prepare food items placed therein by heating, so as to heat and/or cook the food items ready for consumption.

Figure 1:
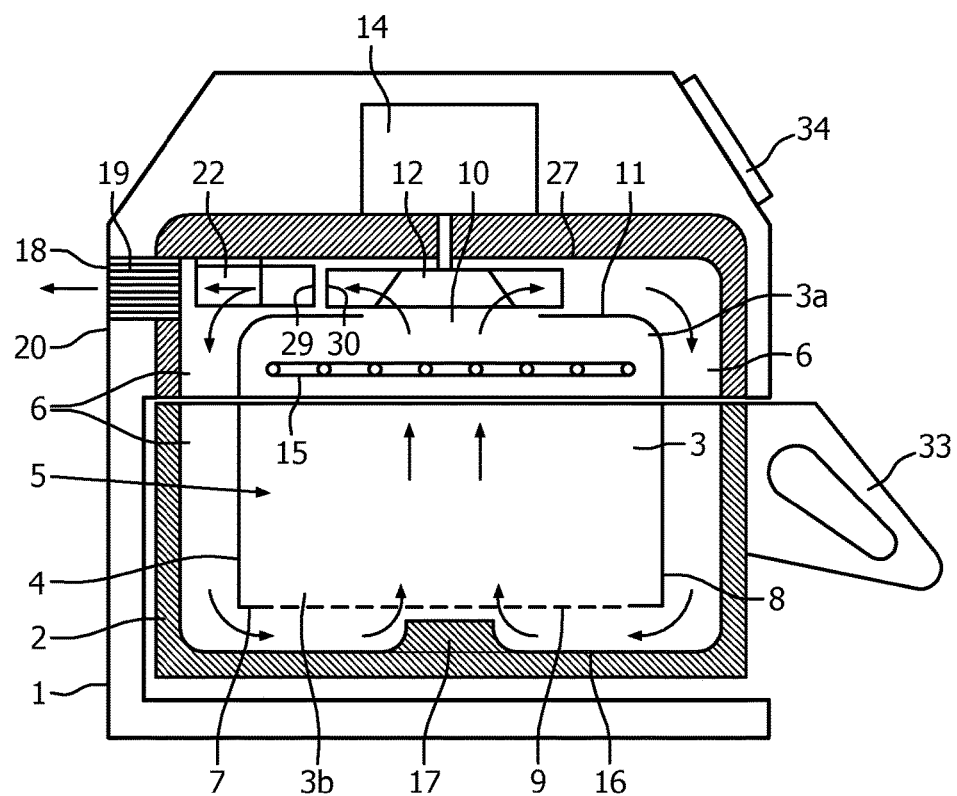
FIG. 1 shows a schematic cross-sectional view of an apparatus for preparing food.
Figure 4:
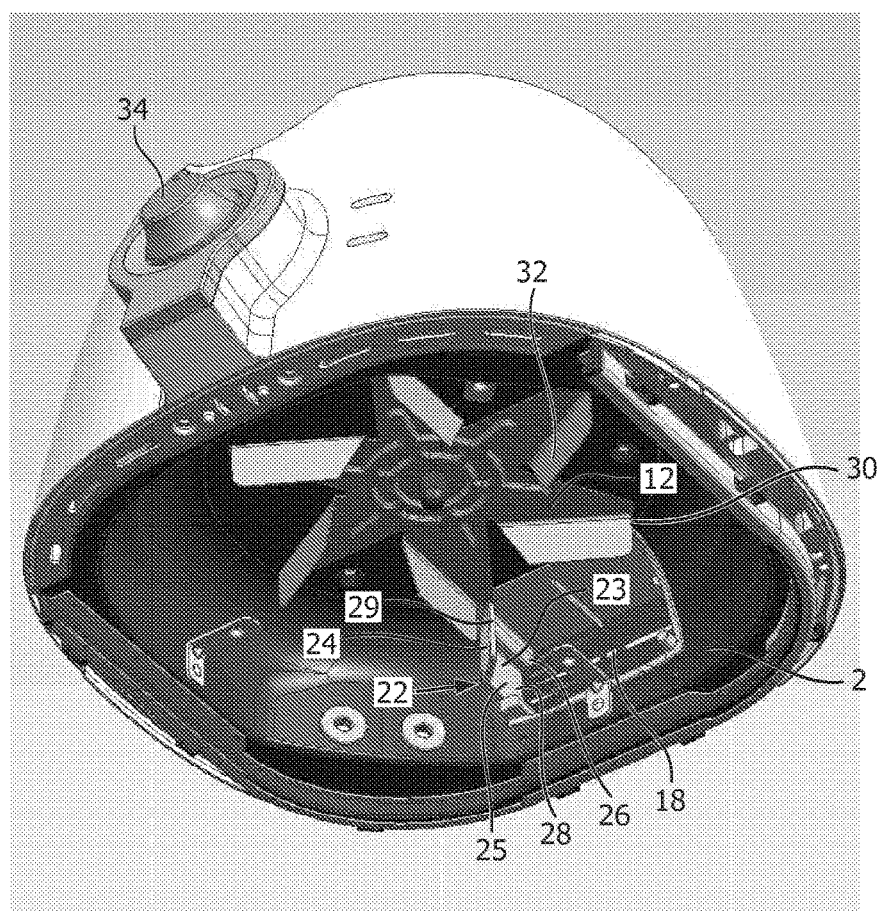
FIG. 4 shows a perspective cross-sectional view of the apparatus for preparing food shown in FIG. 1.
Figure 5:
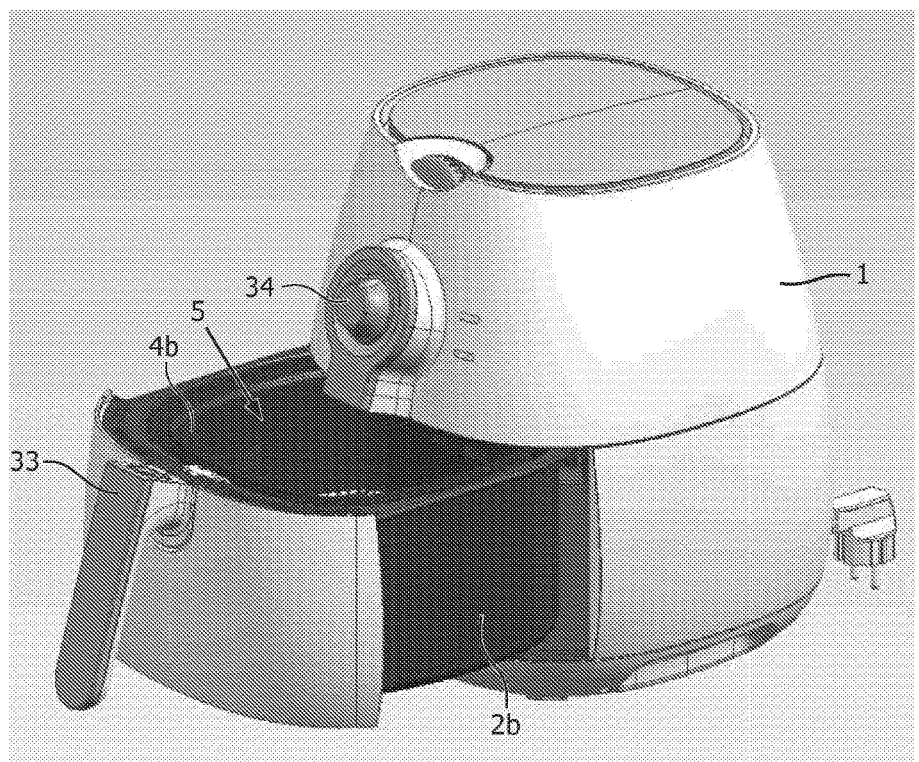
FIG. 5 shows a perspective view of the apparatus for preparing food shown in FIG. 1.

Referring now to FIGS. 1 and 4, the outer shell 1 extends around an outer wall 2 which defines a food preparation chamber 3. An inner wall 4 is disposed in the food preparation chamber 3 and defines a food receiving space 5 in which food items to be heated and/or cooked (not shown) are received. The outer wall 2 and the inner wall 4 extend substantially parallel to and are spaced from each other to define a channel 6 therebetween, which acts as an air guide means along which hot air flows, as will be explained hereinafter.

The inner wall 4 comprises a bottom part 7 and a side wall 8 which extends around and upstands from the bottom part 7. The bottom part 7 of the inner wall 4 is provided with an air-permeable section 9 which acts as a hot air inlet to the food receiving space 5 and a top part 11 of the inner wall 4 is provided with a discharge opening 10 to allow air to flow therethrough. In the present embodiment, the air permeable section 9 extends across the whole bottom part 7, although it may extend across only part of the bottom part 7. The air permeable section 9 is formed by known means, such as a mesh or grid arrangement.

A fan 12 is disposed in the food preparation chamber 3, above the discharge opening 10 of the inner wall 4. The fan 12 is driven by an electric motor 14 acting as a drive means to rotate the fan 12. The fan 12 is operable to move a flow of hot air by sucking air from through the discharge opening 10 by means of a low pressure generated on one side of the fan 12 and expelling a high pressure flow of air into the channel 6 defined between the outer and inner walls 2,4. Therefore, air expelled from the fan 12 flows along the channel 6 acting as an air guide means defined between the outer and inner walls 2,4 to the air permeable section 9 of the inner wall 4. The air then flows through the air permeable section 9, to the food receiving space 5.

A heater 15 acting as a heat radiating means is disposed in an upper part 3a of the food preparation chamber 3. In this embodiment, the heater 15 is disposed in an upper portion of the food receiving space 5 below the discharge opening 10, although it will be appreciated that the heater 15 may be disposed outside the inner wall 4. The heater 15 is disposed to heat air flowing through the upper portion of the food receiving space 5. Furthermore, the heater 15 is positioned in the food receiving space 5 to radiate heat into the heat receiving space 5 and towards any food items disposed therein, as will become apparent hereinafter.

Air flowing in the channel 6 between the bottom part 7 of the inner wall 4 and a base 16 of the outer wall 2, is directed to flow upwardly through the air-permeable section 9 of the inner wall 4 by means of an air deflector 17 which sits on the base 16 of the outer wall 2 and directs the flow of air upwardly.

A vent 18 is formed in the outer wall 2 of the apparatus and defines an air outlet from the food preparation chamber 3 to outside the apparatus. The vent 18 is disposed at a top end of the food preparation chamber 3 and is formed at an upper end of the channel 6 proximate to the fan 12. The vent 18 and fan 12 are positioned at the top end of the food preparation chamber 3 to reduce contact of liquid discharged from the food items collecting on the fan 12 and being discharged through the vent 18.

In the present embodiment, the fan 12 is a radial fan and the vent 18 is formed in the outer wall 2 on a line extending in a radial direction to the axis of rotation of the fan 12.

Figure 2:
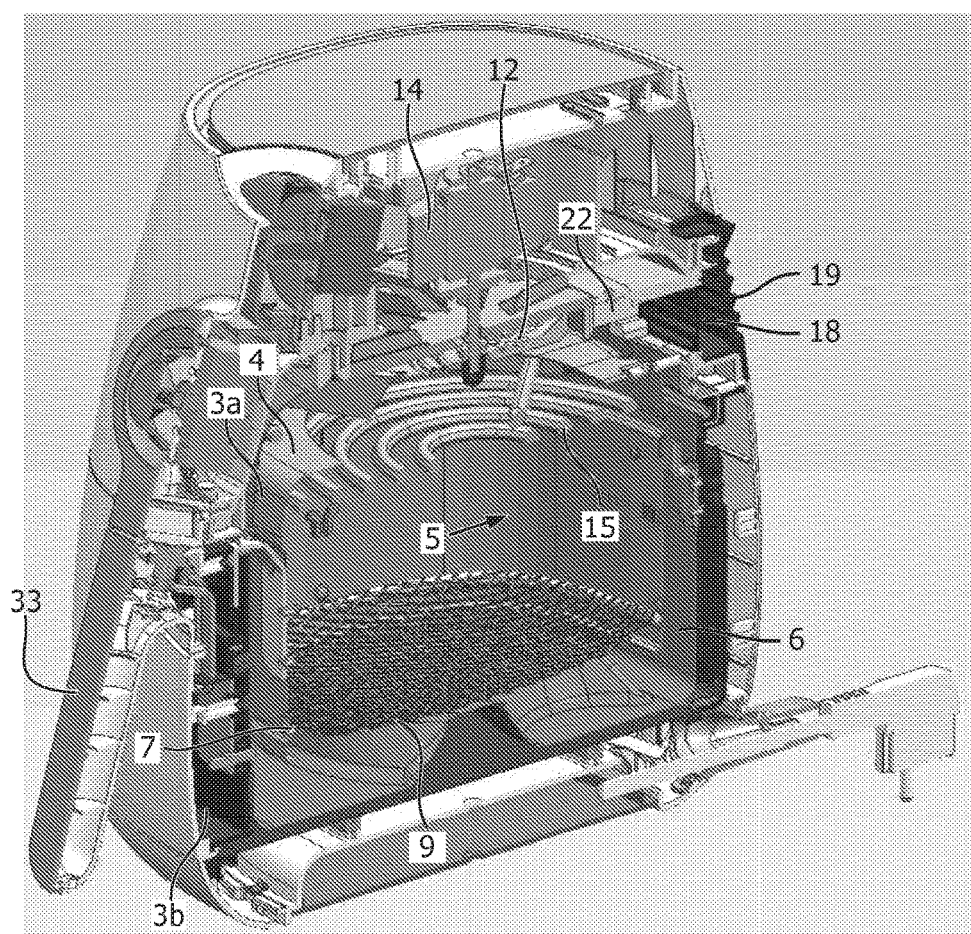
FIG. 2 shows a perspective cross-sectional view of the apparatus for preparing food shown in FIG. 1.
Figure 3:
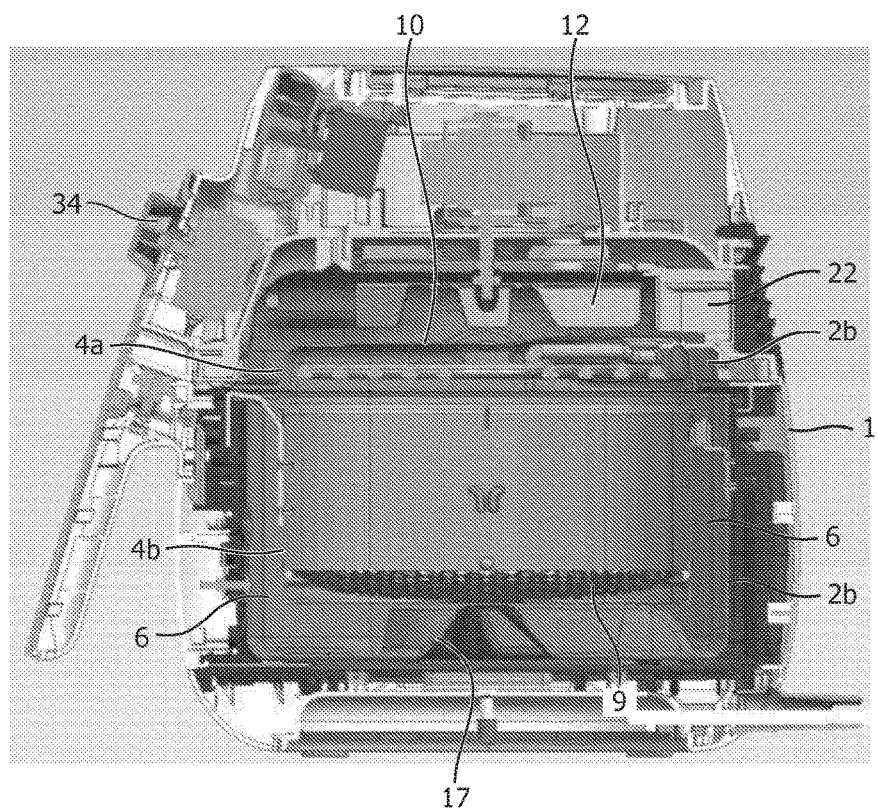
FIG. 3 shows a cross-sectional view of the apparatus for preparing food shown in FIG. 1.

Air guide fins 19 are formed in the vent 18 to deflect the direction of a flow of air being discharged from the food preparation chamber 3 through the vent 18. The air guide fins 19 are arranged at an angle to the vent (refer to FIG. 2) to deflect the flow of air through the vent upwardly so as to prevent hot air being exhausted directly onto a wall or surface disposed next to the apparatus.

Referring in particular to FIGS. 1 and 4, an air guide member 22 is shown. The air guide member 22 is an elongate member, such as a plate, with one face of the plate forming a guide surface 23. The air guide member 22 comprises first and second portions 24,25 with the second portion 25 extending at an angle to the first portion 24, such that guide surfaces of the first and second portions are angled towards each other. In the present embodiment the second portion 25 extends at an angle of 45 degrees to the first portion 24. The second portion 25 of the air guide member 22 upstands from the outer wall 2 along an edge 26, such that the air guide member 22 extends perpendicular to a top surface 27 of the outer wall 2. The air guide member 22 is formed from a plastic, although it is envisaged that other materials may be used. The plastic is suitable for use in the hot, greasy and steamy environment found in the food preparation chamber 3 during use of the apparatus. Although in the present embodiment the air guide member is a bent plate, it will be appreciated that in other embodiments the air guide member is a flat plate or a curved plate, for example.

The air guide member 22 in the present embodiment is integrally formed with at least a section of the top surface 27 of the outer wall 2, although it is envisaged that the air guide may be fixedly mounted to the top surface 27 of the outer wall 2 by known means, for example an adhesive or rivets.

The second portion 25 of the air guide member 22 extends from one edge 28 of the outlet of the vent 18 formed in the outer wall 2, with the guide surface 23 extending perpendicular to the face of the vent 18 and facing the vent 18. The first portion 24 of the air guide member 22 extends to the fan 12 such that an outer edge 29 of the air guide member 22 lies adjacent to a peripheral edge 30 of each of the fan blades 32 of the fan 12 as they rotate about the rotational axis of the fan. Therefore, as the fan rotates, the peripheral edge 30 of each of the fan blades 32 passes the outer edge 29 of the air guide member 22.

The lower end of the air guide member 22 extends below the fan 12. The fan 12 is configured to rotate in a clockwise direction (as seen in FIG. 4), such that the fan blades 32 move towards the guide surface 23 of the air guide member 23 and therefore urge the airflow theretowards which acts to increase the pressure in the region of the vent 18, as will be described in detail hereinafter.

The food preparation chamber 3 is arranged in two parts, the upper part 3a and a lower part 3b. The upper part 3a is fixedly mounted to the outer shell 1 of the apparatus, and the lower part 3b is releasable from the upper part 3a so that it is removable from the upper part 3a to enable access to the food preparation chamber 3. The lower part 3b comprises a lower section 2a, 4a of both the outer and inner walls 2,4, including the air permeable section 9 of the inner wall 4, and a handle 33 to aid the removal of the lower part 3b from shell 1 and to separate it from the upper part 3a. Therefore, the lower part 3b forms a basket or basin shaped arrangement, with an upper opening, so that food items may be placed in or removed from the food receiving space 5.

The lower part 3b of the food preparation chamber is insertable in the outer shell 1 so that the lower part 3b lies flush with the upper part 3a to form the food preparation chamber 3.

A control panel 34 is mounted to the outer shell 1 to enable the operation of the apparatus to be controlled, for example the time of operation and the temperature in the food preparation chamber 3.

Operation of the apparatus for preparing food will now be described with reference to FIGS. 1 to 5.

A user initially removes the lower part 3b of the food preparation chamber 3 from the outer shell 1 by holding the handle 33 and extracting the lower part 3b from the outer shell 1. This separates the lower part 3b from the upper part 3a of the food preparation chamber 33 and allows the user to access the food receiving space 5. The user then places the desired food items into the food receiving space 5, placing them on the air permeable section 9. This positioning of the food items on the air permeable section 9 allows hot air to be blown past the food to improve heating of the food due to the hot air flow, and allows liquid from the food, for example water and oil to fall through the air permeable section 9 from the food receiving space 5.

The lower part 3b is then inserted in the outer shell 1 so that the upper and lower parts 3a,3b of the food preparation chamber 3 lie flush with each other. The user is then able to operate the apparatus by means of the control panel 34. When the apparatus is operated, the heater 15 is operated to emit heat and the fan 12 is operated to circulate a flow of air in the food preparation chamber 33.

When the heater 15 is operated, it heats the food in two different manners, by radiating heat to heat the food items directly in the food receiving chamber 5, and by heating the air flowing past it by use of the fan 12 which circulates hot air to heat the food items.

The fan 12 draws hot air heated by the heater 15 through the discharge opening 10 by generation of a low pressure proximate thereto. The hot air is then drawn through the fan 12 and is expelled at a high pressure from the fan 12 into the channel 6 defined between the outer and inner walls 2,4. The channel 6 acts as an air guide means to guide the flow of hot air towards the lower part 3b of the food preparation chamber 3. The flow of hot air then flows successively through the air permeable section 9, food receiving space 5 and the discharge opening 10.

When the flow of air moves through the food receiving space 5 it flows over the food items disposed therein and acts to heat the food items. It will be appreciated that the flow of air over food items includes each of the flow of air past, through and/or around food items. Water and fat are discharged from the food items and enter the air flow to form steam and oil particles. The air then flows past the heater 15 to be raise the temperature of the air again, and is drawn back towards the fan 12. Thereinafter, the air circulates in the food preparation chamber 3. The pressure in the food preparation chamber 3 increases as steam is generated by the evaporation of water discharged from the food items.

As the hot air is expelled by the fan 12, a portion of the flow of air at a raised pressure is expelled towards the air guide member 22. A portion of the flow of hot air is therefore directed by the air guide member 22 towards the vent 19 formed in the outer wall 3 and is therefore exhausted from the chamber 3. The angle of the first and second portions 24,25 of the air guide member 22 helps to direct the flow of hot air to the vent 18. As a portion of the flow of hot air expelled by the fan under high pressure is directed to the vent 18 by the air guide member 22, the volume of air expelled is increased.

In existing known apparatus, air in the food preparation chamber is exhausted from the chamber through the gap formed in the front side of the apparatus by the connection of the upper and lower parts of the food preparation chamber due to the increased pressure in the food preparation chamber. Therefore, a hot flow of air including steam and oil particles is expelled towards a user. However, in the present invention the vent 18 is disposed at the rear side of the apparatus, away from a user.

As a portion of the flow of hot air under a raised pressure is directed towards the vent 18, air is urged to discharge through the vent by the air guide member 22. This ensures that air is safely vented through the rear of the apparatus. Furthermore, because a portion of the flow of air is directed towards the vent 18 by the air guide member 22, the volume of air exhausted through the vent 18 is increased, and the volume of air that is therefore exhausted through the gaps in the front of the apparatus is reduced. Furthermore, venting of the air may be better controlled to enable a better control of the pressure in the food preparation chamber 3.

It will be appreciated that the above described arrangement allows the apparatus to have user friendly gaps surrounding the removable food preparation chamber while controlling the location of the exhaust of air, steam and oil from the apparatus. Furthermore, the above described arrangement also allows the convenient placement of the user removable part of the food preparation chamber at the user facing front side of the apparatus so that the lower part of the chamber is removable from this front side. This arrangement is therefore both user friendly and safe. Furthermore, the air guide member improves the flow of air in the food preparation chamber which leads to an improved food preparation result.

When the food is sufficiently heated, the user turns off the apparatus and disengages the lower part 3a of the food preparation chamber 3 from the upper part 3b to allow access to the food items. The food items may then be removed from the food receiving space 5 and consumed.

Although in the present embodiment the air guide member is a plate, it will be appreciated that the air guide member may have any arrangement that directs a portion of the air flow towards the vent 18.

Although claims have been formulated in this application to particular combinations of features, it should be understood that the scope of the disclosure of the present invention also includes any novel features or any novel combinations of features disclosed herein either explicitly or implicitly or any generalisation thereof, whether or not it relates to the same invention as presently claims in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. An apparatus for preparing food comprising:
  a. an inner wall defining a food receiving space, said inner wall including an air inlet and an air discharge opening;
  b. a fan arranged for moving a flow of air successively through the air inlet, the food receiving space and the air discharge opening;
  c. an outer wall disposed relative to said inner wall to cooperatively form an air guide for returning the flow of air from the air discharge opening toward the air inlet separately from the food receiving space;
  d. a heater disposed in the apparatus for effecting heating of said flow of air;
  e. a vent formed through the outer wall and in communication with the food receiving space to provide an outlet enabling a portion of the flow of air to exhaust to outside of the apparatus;

f. an air guide disposed adjacent to the fan and extending to an edge of the vent to direct said portion of the flow of air toward the vent; and g. an air deflector on a base of the outer wall, and configured to direct the flow of air upwardly.

2. The apparatus according to claim 1 where the vent is formed in the outer wall on a line extending in a radial direction to a rotational axis of the fan.

3. The apparatus according to claim 1 where the fan is disposed at the discharge opening.

4. The apparatus according to claim 1 where the air inlet is formed in a lower part of the inner wall and the discharge opening is formed in an upper part of the inner wall.

5. The apparatus according to claim 1 where the air inlet comprises an air-permeable section formed in the inner wall.

6. The apparatus according to claim 1 where the air guide comprises a plate having an air guide surface arranged to direct said portion of the flow of air toward the vent.

7. The apparatus according to claim 4 where the air guide comprises a first portion disposed adjacent to the fan and a second portion disposed adjacent to the vent, said second portion extending at an angle to the first portion such that air guide surfaces of the first and second portions are angled towards each other.

8. The apparatus according to claim 1 where the air guide is mounted to the outer wall.

9. The apparatus according to claim 1 where the air guide is disposed in the air guide for returning the air from the discharge opening toward the air inlet.

10. The apparatus according to claim 1 where the inner and outer walls form a food preparation chamber comprising first and second parts, one of said parts being removable from a front side of the apparatus to facilitate removal of food items from the food receiving space, said vent being formed in a rear side of the apparatus opposite the front side.

11. The apparatus according to claim 1 where the air guide is configured to direct a portion of the flow of air toward the rear side of the apparatus.

12. The apparatus according to claim 1 where the heater is positioned in an upper part of the food receiving space.

13. The apparatus according to claim 1 and comprising air guide fins to deflect the flow of air exhausted through the vent.

14. The apparatus according to claim 5, wherein the flow of air upwardly by the air deflector travels through an air-permeable section of the inner wall.

* * * * *